(12) United States Patent
Chen (10) Patent No.: US 7,765,941 B2
(45) Date of Patent: Aug. 3, 2010

(54) COLLAPSIBLE SUPPORT STAND FOR BARBECUE STOVE

(75) Inventor: Jan-Nan Chen, Taichung (TW)

(73) Assignee: Pro-Iroda Industries, Inc., Taichung (TW)

( * ) Notice: Subject to any disclaimer, the term of this patent is extended or adjusted under 35 U.S.C. 154(b) by 12 days.

(21) Appl. No.: 11/934,105

(22) Filed: Nov. 2, 2007

(65) Prior Publication Data

US 2009/0114780 A1    May 7, 2009

(51) Int. Cl.
*A47B 3/083* (2006.01)
(52) U.S. Cl. .................. 108/169; 108/174; 108/159.11
(58) Field of Classification Search .............. 108/162, 108/166–169, 171, 173, 174, 115, 36, 170, 108/172, 38, 25, 90, 159.11, 157.18, 159.12, 108/158.13; 248/166, 440, 434
See application file for complete search history.

(56) References Cited

U.S. PATENT DOCUMENTS

| | | | | |
|---|---|---|---|---|
| 229,600 | A | * | 7/1880 | Freeborn et al. ............. 108/171 |
| 287,739 | A | * | 10/1883 | Tull .......................... 108/171 |
| 939,824 | A | * | 11/1909 | Forbes et al ................ 108/69 |
| 1,930,176 | A | * | 10/1933 | Metzler ..................... 108/175 |
| 2,781,525 | A | * | 2/1957 | Bauer ......................... 5/620 |
| 2,942,921 | A | | 6/1960 | Rachman et al. ............. 108/26 |
| 2,957,588 | A | * | 10/1960 | Muller ....................... 108/171 |
| 3,097,748 | A | * | 7/1963 | Drabert et al. .............. 108/171 |
| 3,138,122 | A | * | 6/1964 | Mondineu .................. 108/171 |
| 4,067,266 | A | * | 1/1978 | Lafargue .................... 108/172 |
| 4,102,555 | A | * | 7/1978 | Tobolski .................... 312/240 |
| 4,492,215 | A | * | 1/1985 | DiGianvittorio ............ 126/9 R |
| 5,020,799 | A | * | 6/1991 | Chang ......................... 473/15 |
| 5,052,308 | A | * | 10/1991 | Brown ....................... 108/118 |
| 5,325,640 | A | * | 7/1994 | Luedke et al. .................... 52/9 |
| 5,433,235 | A | * | 7/1995 | Miric et al. .................. 135/67 |
| 5,794,540 | A | * | 8/1998 | Dombrowski et al. ......... 108/3 |
| 6,145,524 | A | * | 11/2000 | Li et al. ....................... 135/67 |

(Continued)

FOREIGN PATENT DOCUMENTS

TW    583946    4/2004

OTHER PUBLICATIONS

WIPO Patent Publication No. WO 97/27792 A2, Aug. 7, 1997, 24 pages.

(Continued)

*Primary Examiner*—José V Chen
(74) *Attorney, Agent, or Firm*—Alan Kamrath; Kamrath & Associates PA (57) ABSTRACT

A support stand for a barbecue stove includes two table members, a plurality of support feet and at least one leg brace assembly pivotally connecting the table members to the support feet. Each leg brace assembly has a hinge, an actuating device and a driving device and connects the table members to the support feet. A user can operate the leg brace assembly to detach the driving device from the actuating device and can hold handles of the table members to set the table members upright so that the driving device can move downward quickly and the support stand will be collapsible quickly. The table members further include a plurality of receptacles formed thereon and adapted for receiving the feet of the barbecue stove so that the barbecue stove can be disposed on the table members stably.

15 Claims, 10 Drawing Sheets

U.S. PATENT DOCUMENTS

| | | | |
|---|---|---|---|
| 6,311,944 B1 * | 11/2001 | McKsymick et al. | 248/461 |
| 6,386,628 B2 * | 5/2002 | Bue | 297/158.3 |
| 7,080,640 B2 | 7/2006 | Sanders et al. | 126/30 |
| 7,086,395 B1 * | 8/2006 | Li | 126/25 R |
| 7,418,907 B2 * | 9/2008 | Haimoff | 108/91 |
| 7,497,226 B2 * | 3/2009 | Li et al. | 135/74 |
| 2005/0236025 A1 * | 10/2005 | Gale et al. | 135/74 |

OTHER PUBLICATIONS

Australian Patent Publication No. AU 2005202318 A1, Jan. 5, 2006, 25 pages.

* cited by examiner

COLLAPSIBLE SUPPORT STAND FOR BARBECUE STOVE

BACKGROUND OF THE INVENTION

The present invention relates to a collapsible support stand for a barbecue stove.

Referring to Taiwan patent NO. 583946, a conventional barbecue stove includes a base, a cylinder body and a stove body, with the base, the cylinder body and the stove body combined to each other undetachably. The volume of the conventional barbecue stove is huge. Thus, a user could not easy to move the conventional barbecue stove, and it occupies more storage. However, the conventional barbecue stove does not require the user to squat down to barbecue, but the shortcomings are the conventional barbecue stove occupies more storage and the difficulty of detachment.

SUMMARY OF THE INVENTION

According to the present invention, a support stand includes a plurality of support feet, two table members and two leg brace assemblies. The support feet support the table members and stand on the ground, and the leg brace assemblies connect the table members to the support feet. The support feet are provided a distance between the table members and ground so as to facilitate the use of the barbecue stove disposed on the support stand. The table members include, a plurality of receptacles for receiving the feet of the barbecue stove so that the barbecue stove will not slide on the table members. The leg brace assemblies are provided for fixing the table members on the unfolded position, and when the support stand is collapsing, the leg brace assemblies are provided to fold the table members quickly.

BRIEF DESCRIPTION OF THE DRAWINGS

The present invention will be described via detailed illustration of the preferred embodiments referring to the drawings.

DETAILED DESCRIPTION OF PREFERRED EMBODIMENT

A collapsible support stand for a barbecue stove according to a first embodiment of the present invention is shown in the drawings and of includes a plurality of support feet 10, two table members 20 disposed onto the support feet 10, two primary shelves 30 with each primary shelf 30 installed between two support feet 10, and two leg brace assemblies 40. Each leg brace assembly 40 is adapted for pivotally connecting the table members 20 to the primary shelves 30.

In the preferred form, there are two pairs of support feet 10. Each support foot 10 is bent and includes a first end and a second end. Each first end connects to the table members 20 and has a first pivoting hole 11 transversely formed thereon. Each second end is provided for standing on the ground and has a second pivoting hole 12 transversely formed thereon. Each primary shelf 30 is disposed between the first and second ends of a pair of support feet 10.

Each table member 20 includes two pivoting portions 21 respectively protruding from two ends thereof. A concavity 23 is formed on the outer periphery of each table member 20 adjacent to each pivoting portion 21. A handle 24 is formed on the outer periphery of each table member 20 between two pivoting portions 21. Two receptacles 25 are formed on the top surface of each table member 20 opposite to the pivoting portions 21. Two recesses 26 are formed on the bottom of each table member 20 and communicate with the outer periphery of each table member 20. The pivoting portions 21 of one of the table members 20 respectively connect to the related pivoting portions 21 of another table member 20 via two pins 22 for coupling two table members 20 to each other. Each recess 26 has a hole 261 therein corresponding to the first pivoting hole 11 of each support foot 10. A hollow space is juxtaposed between the handle 24 and the outer periphery of each table member 20 and provided for a user to hold easily.

The first end of each support foot 10 pivotally connects to one of the table members 20, and the second end of each support foot 10 is provided to stand on the ground. Further each support foot 10 is bent, and the area surrounded with the first ends of the support feet 10 is smaller than the area surrounded with the second ends of the support feet 10 so as to provide a stronger support.

Each primary shelf 30 includes a first side adapted for being installed pivotally onto a pair of support feet 10 below the associated table member 20 and a second side connecting to the second side of another primary shelf 30. The second side of each primary shelf 30 has two ears 31 respectively protruding from two ends of the second side, and two bolts 32 are provided for inserting through the ears 31 so as to couple pivotally the primary shelves 30 with each other.

While the two table members 20 are unfolded, each hinge 43 is disposed on the concavity 23 and includes a received portion 431 on the bottom thereof toward the actuating device 44 and receiving the second end of the second, hinge leg 42. A first protrusion 432 is formed transversely on the side thereof and for abutting with the related pivoting portion 21. An orifice 433 is defined in the first protrusion 432, with the pin 22 inserted through the pivoting portion 21 and the orifice 433 so as to install the hinge 43 on the table members 20. Two second protrusions 434 are respectively defined on the two sides of the hinge 43 adjacent to the first protrusion 432, and a block portion 435 protrudes longitudinally from the hinge 43 above the first protrusion 432.

Each leg brace assembly 40 includes two first legs 41, a second, hinge leg 42, a hinge 43, an actuating device 44 installed to the hinge 43, and a driving device 45 received in the actuating device 44 and respectively connecting to the first legs 41 and second, hinge legs 42. Each first leg 41 has a first end bent toward the leg brace assembly 40 and for inserting into the driving device 45 and a second end bent toward the related support foot 10 and for inserting into the related second pivoting hole 12. Each second, hinge leg 42 includes a first end having a hole 421, which is longitudinally formed on the extreme thereof and communicating to the related ear 31 so as to connect to the related primary shelf 30 via the bolt 32. Each second, hinge leg 42 further includes a second end having an orifice 422 formed therethrough transversely and for inserting into the driving device 45, with the first end of each second leg 42 being perpendicular to the second end of each second leg 42.

Each actuating device 44 includes an actuating portion 441, a mounted portion 442 formed in the interior surface of the actuating portion 441, an elastic element 443 adapted to be disposed on the mounted portion 442, two apertures 444 formed on the two sidewalls of the actuating device 44 and pivotally mounted on the second protrusions 434, and a limited portion 445 defined on the bottom edge of the interior surface thereof.

Each driving device 45 includes a through-hole 451 longitudinally defined therein, a gap 452 formed on the top edge of the through-hole 451 and adapted for disposing the block portion 435 so as to prevent the driving device 45 from turning relative to the hinge 43, a projection 453 protruding from the outer periphery thereof, and two apertures 454 formed thereon and adapted for receiving the first legs 41.

While the support stand is unfolded, the table members 20 are parallel to the primary shelves 30, and both the leg brace assemblies 40 are in a first position. Simultaneously, the actuating device 44 abuts with the driving device 45, and the limited portion 445 provided is below the projection 453.

While folding the support stand, a user presses the actuating portion 441 of the actuating device 44, and the limited portion 445 pivotally detaches from the driving device 45 gradually so that the driving device 45 can move along the second end of the second leg 42 longitudinally. Then, the actuating device 44 will pivot to return to the original position via the elastic element 443, and the driving device 45 moves upward to drive the two first legs 41 to move upward.

Subsequently, the user can hold the handles 24 of the table members 20 to pivot the table members 20 relative to the support feet 10 and to be upright, with each driving device 45 and the first legs 41 moving downward quickly. Further, the support feet 10 are partially received in the related recesses 26. When the support stand is unfolded, the support feet 10 are perpendicular to the table members 20. When the support stand is collapsed, the support feet 10 are parallel to the table members 20. The driving device 45 is moving downward, and the first ends of the first legs approach each other.

Figure 1:
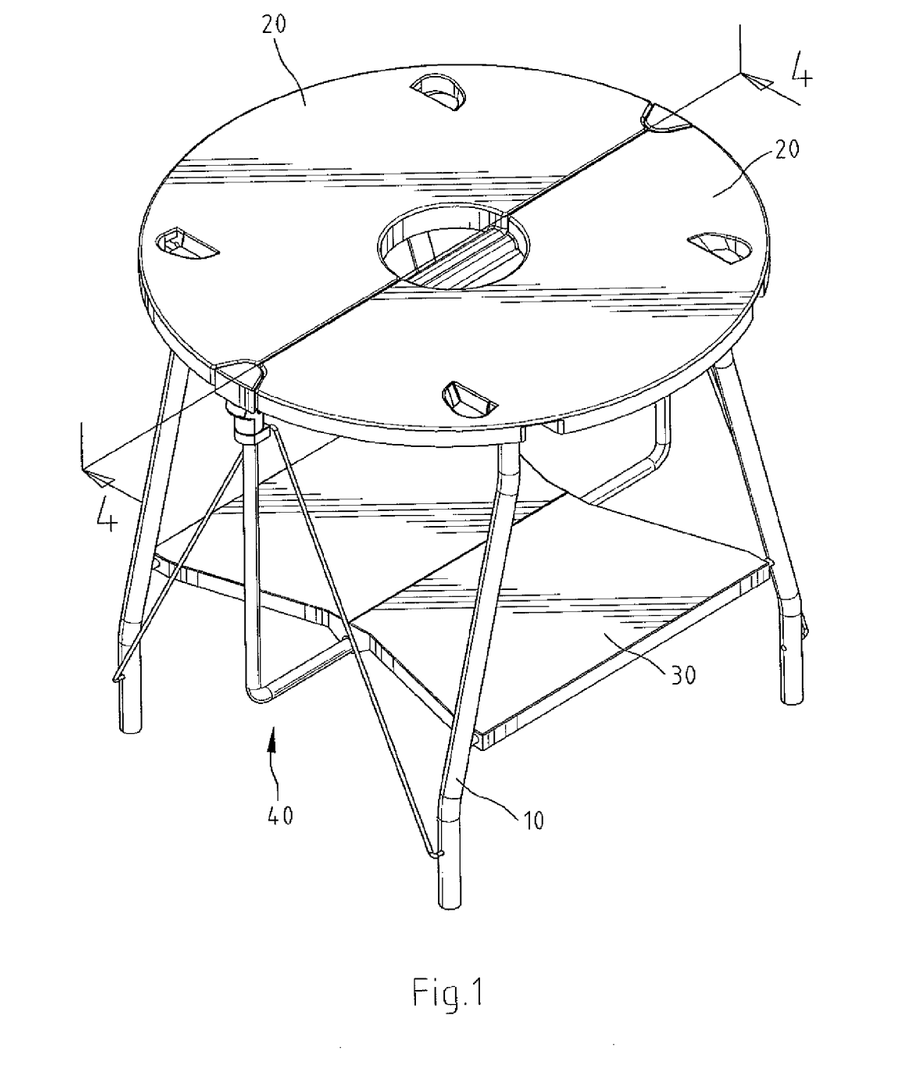
FIG. 1 is a perspective view of a collapsible support stand for a barbecue stove according to a first embodiment of the present invention.
Figure 2:
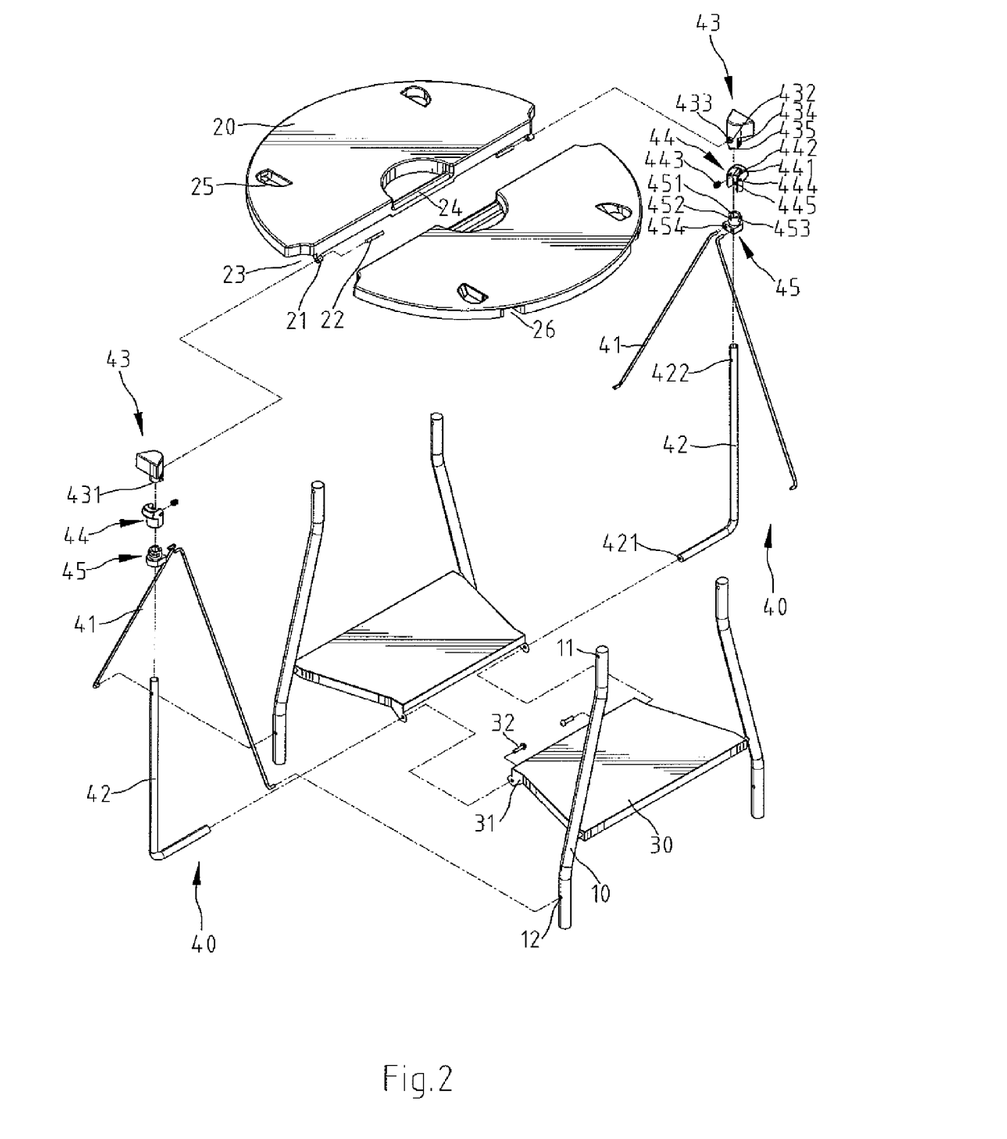
FIG. 2 is an exploded view of the collapsible support stand for the barbecue stove shown in FIG. 1.
Figure 3:
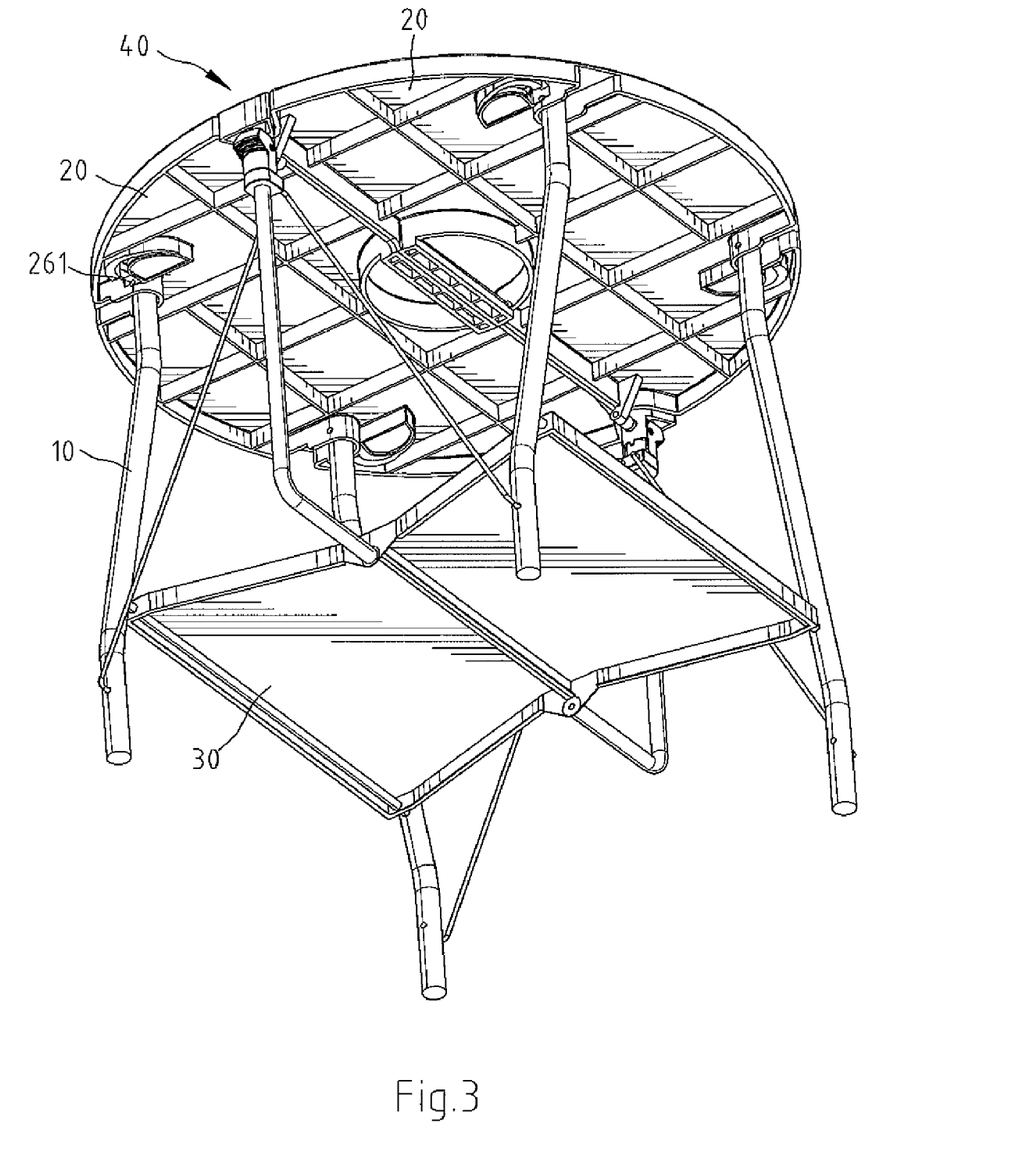
FIG. 3 is another perspective view of the collapsible support stand for the barbecue stove shown in FIG. 1, illustrating the bottom of the table.
Figure 4:
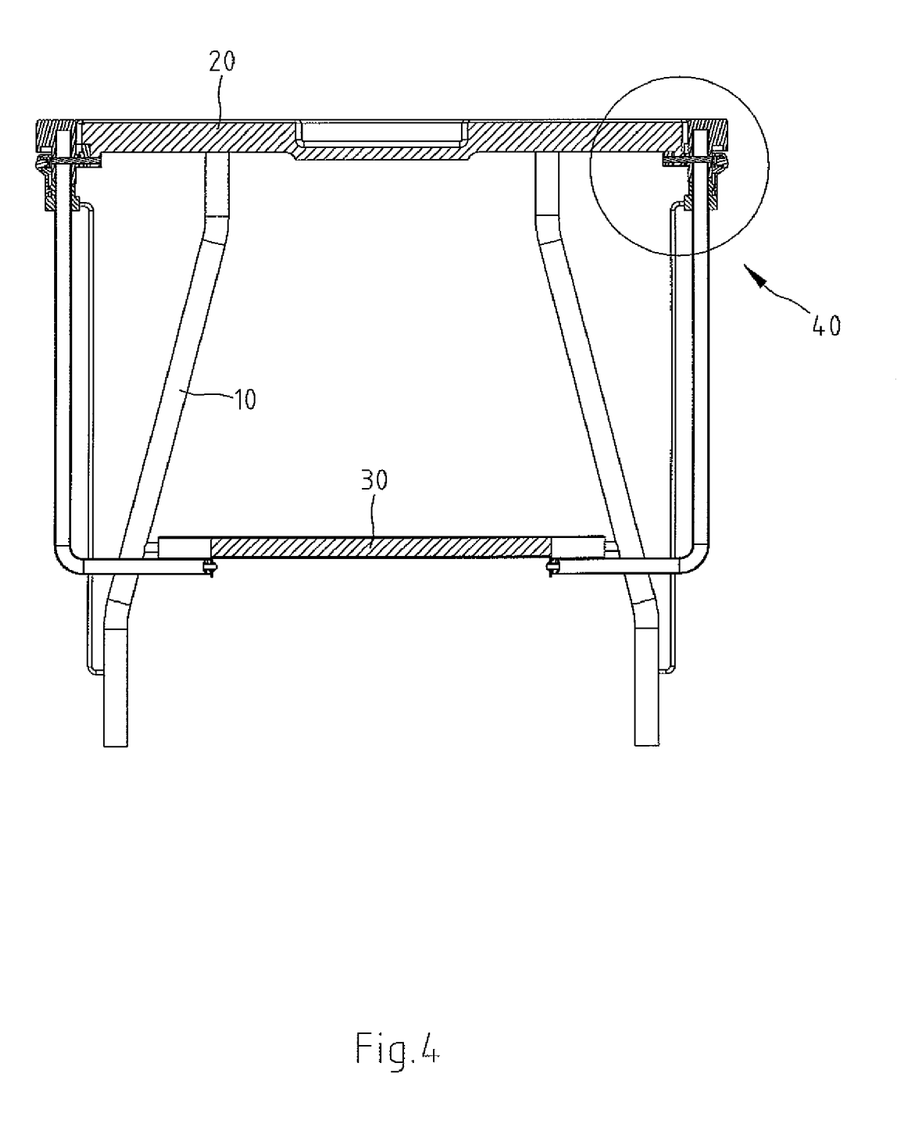
FIG. 4 is a cross-sectional view of the collapsible support stand taken along a line 4-4 shown in FIG. 1.
Figure 5:
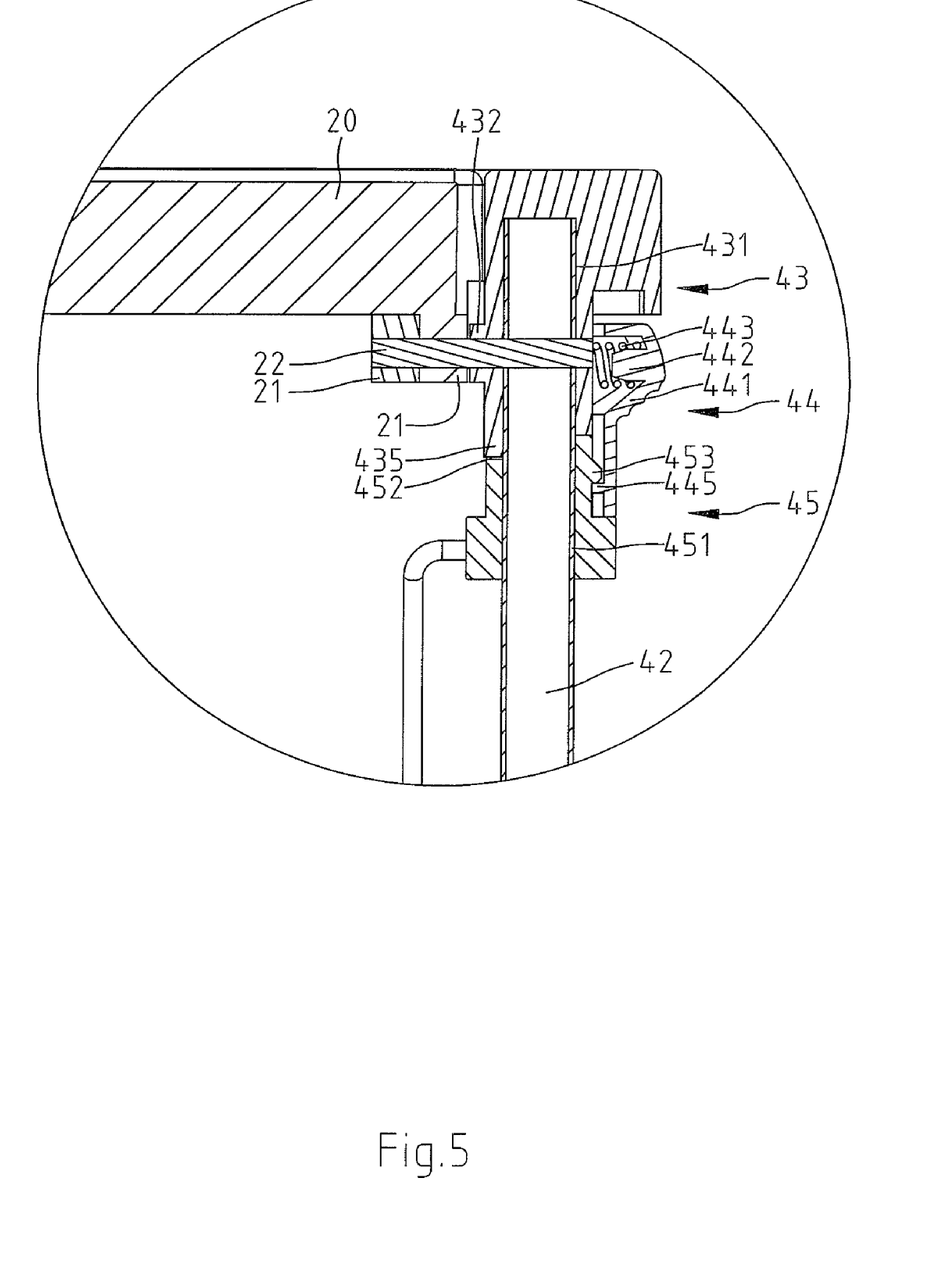
FIG. 5 is an enlarged partial view of the collapsible support stand of FIG. 4.
Figure 6:
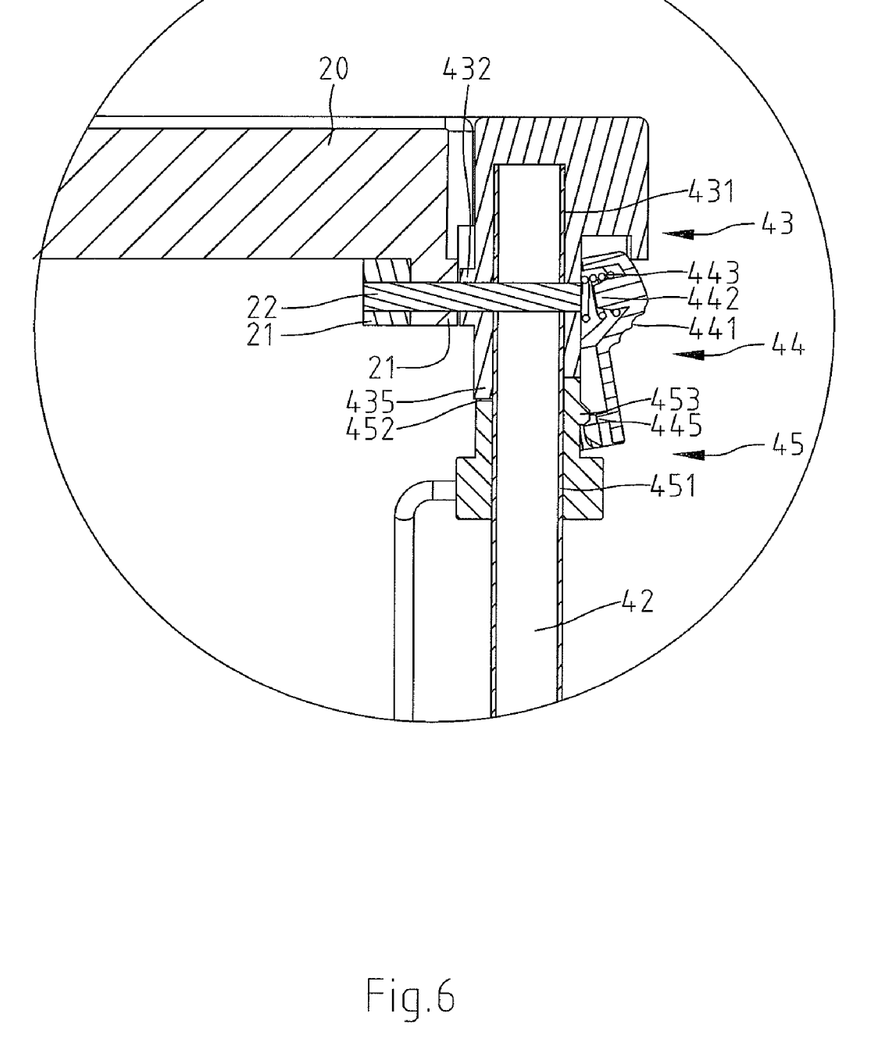
FIG. 6 is an enlarged partial view similar to FIG. 5.
Figure 7:
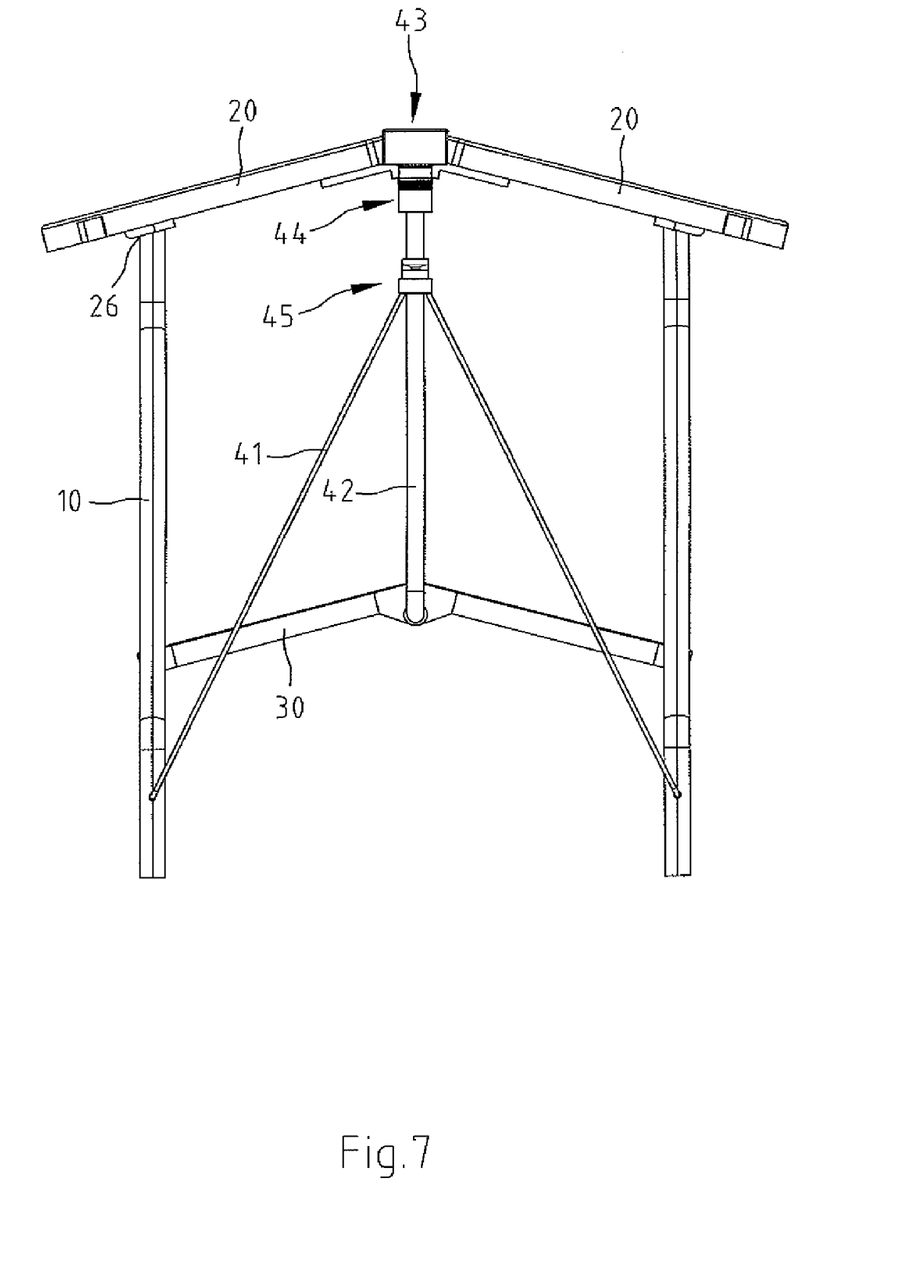
FIG. 7 is a side view of the collapsible support stand for the barbecue stove shown in FIG. 1.
Figure 8:
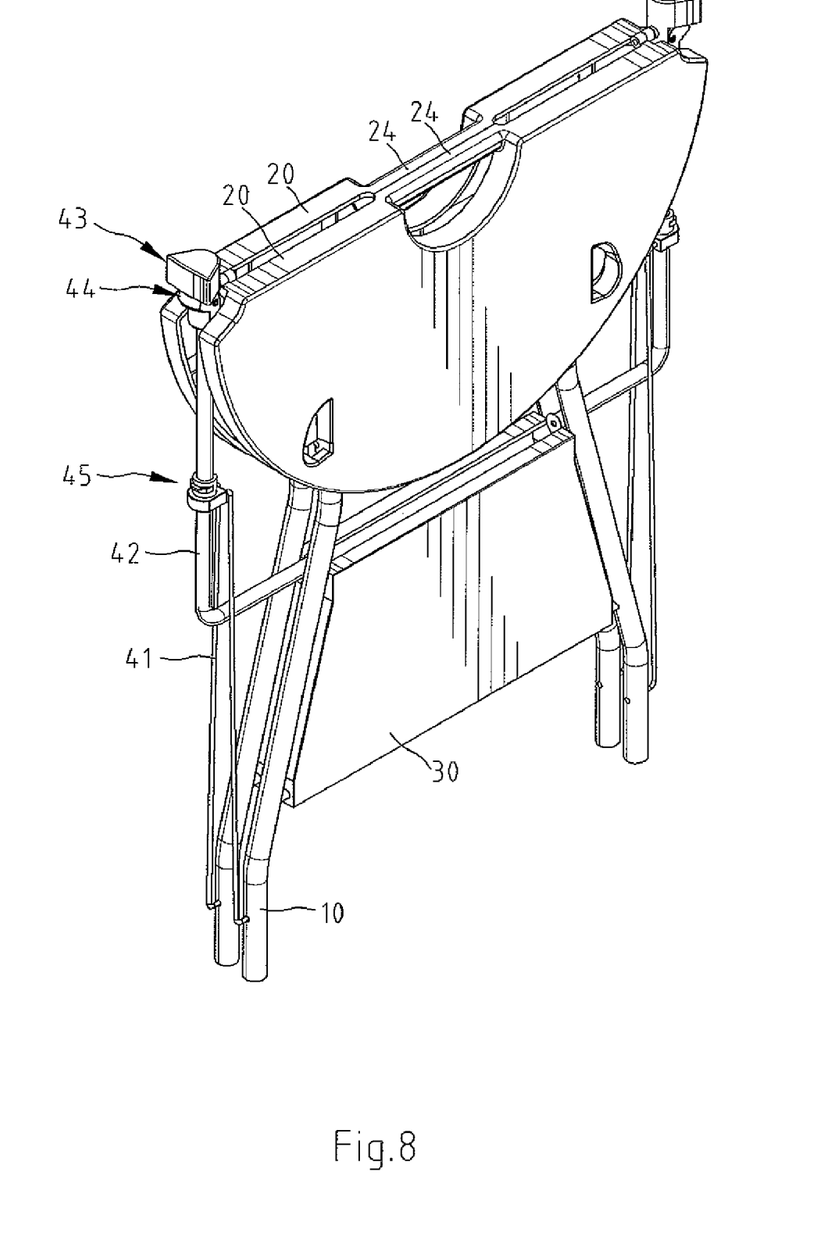
FIG. 8 is another perspective view of the collapsible support stand for the barbecue stove shown in FIG. 1, illustrating the stand being collapsed.
Figure 9:
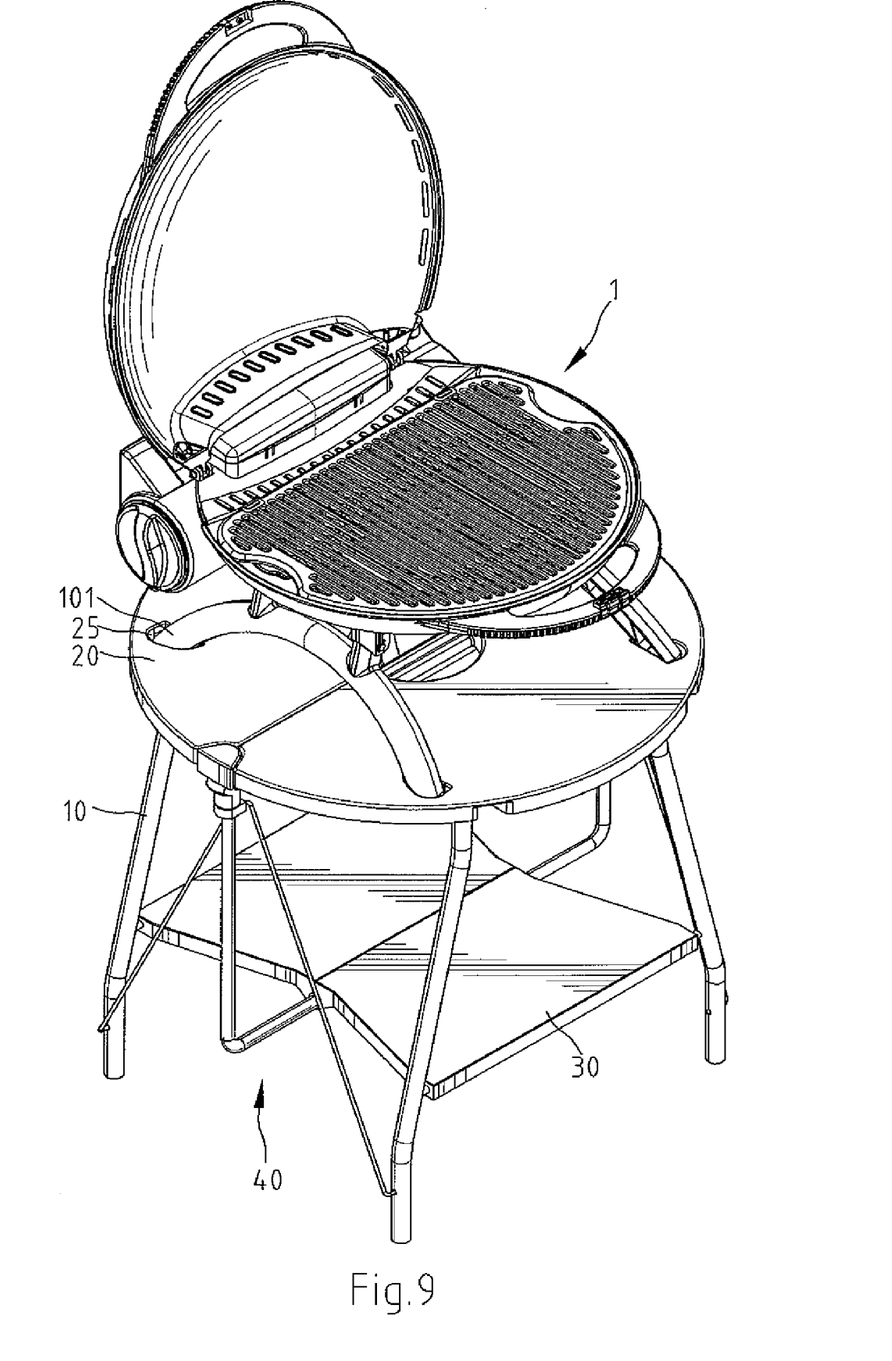
FIG. 9 is another perspective view of the collapsible support stand for the barbecue stove shown in FIG. 1, illustrating a barbecue stove disposed onto the support stand.

Referring to FIG. 9, a barbecue stove 1 is arranged on the support stand and includes a plurality of feet 101 disposed onto the related receptacles 25 of the table members 20 so that the barbecue stove 1 can be supported stably on the support stand without sliding on the table members 20.

Figure 10:
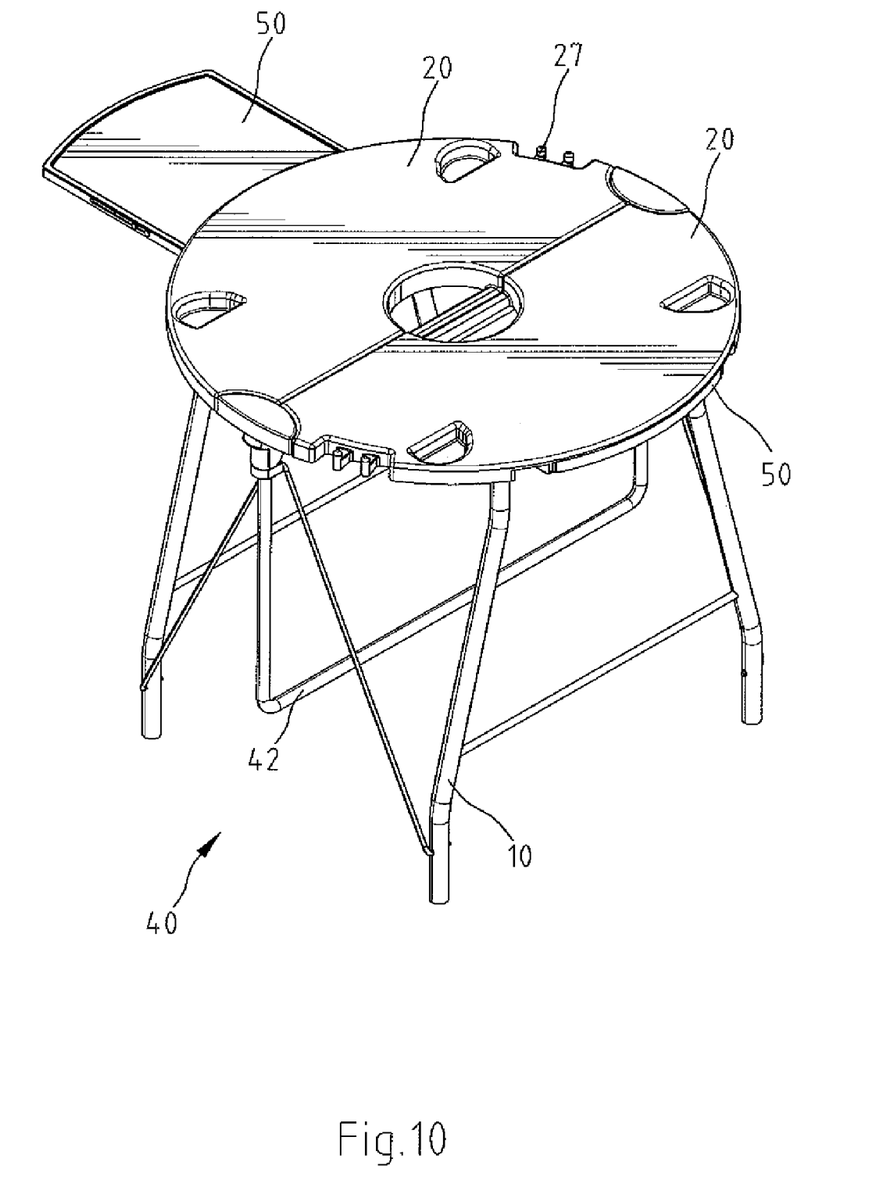
FIG. 10 is a perspective view of a collapsible support stand for a barbecue stove according to a second embodiment of the present invention.

Referring to FIG. 10, a second embodiment of the present invention is similar to the first embodiment except that the second leg 42 is U-shaped, and the primary shelves 30 are omitted. The support stand further includes two second shelves 50 alternatively received on the bottom of the table members 20 and adapted upon which things for a barbecue can be laid when the second shelves 50 are pulled, from the primary shelves 30. A plurality of hooks 27 are formed on the periphery of the primary shelves and adapted for hanging things for a barbecue. Therefore, it can facilitate the use of the support stand.

The present invention has been described via the detailed illustration of the preferred embodiments. Those skilled in the art can derive variations from the preferred embodiments without departing from the scope of the present invention. Therefore, the preferred embodiments shall not limit the scope of the present invention defined in the claims.

What is claimed is:

1. A support stand for a barbecue stove comprising:
   first and second table members, each table member including first and second pivoting portions formed on an end thereof, with the first and second pivoting portions of the first table member pivotally connected to the first and second pivoting portions of the second table member via first and second pins inserted therethrough, with the table members provided for disposing the barbecue stove, each of the first and second table members having first and second support feet, each support foot including a first end pivotally installed to a bottom of the corresponding table member and a second end provided for standing on the ground, each support foot including a first leg having a first end and a second end, with the second end of each first leg pivotally connecting to the second end of the corresponding support foot;
   first and second hinge legs each having an upper end;
   first and second hinges mounted on the upper ends of the first and second hinge legs, with the first and second pins of the first and second table members inserted through the first and second hinge legs and the first and second hinges;
   first and second driving devices slideably mounted on the first and second hinge legs, wherein each driving device includes a through-hole through which the corresponding hinge leg is inserted, with the first and second driving devices pivotally connecting with the first end of the first leg of the corresponding support foot, wherein each hinge includes an actuating portion pivotal relative thereto and including a limited portion defined thereon, with each driving device including a projection engageable by the limited portion of the corresponding actuating portion.

2. The support stand according to claim 1, wherein each table member further includes a top surface opposite the bottom and a hollow space extending between the top surface and the bottom and spaced from the end to form a handle on the end between the first and second pivoting portions, with the hollow space juxtaposed between the handle and each table member and provided for a user to hold.

3. The support stand according to claim 2, wherein each table member further includes first and second recesses formed on the bottom thereof opposite to the first and second pivoting portions, with the first and second recesses communicating with a periphery of the table member, with each recess receiving the first end of the corresponding first and second support feet.

4. The support stand according to claim 2, wherein each table member further includes a plurality of receptacles formed on a top surface of the table member and adapted for installing feet of the barbecue stove.

5. The support stand according to claim 2, wherein the end of each table member extends between an outer periphery, with first and second concavities formed in the end and adjacent to the outer periphery, with the first and second hinges located in the first and second concavities of the first and second table members.

6. The support stand according to claim 5, further comprising a block portion extending longitudinally from each of the first and second hinges along the first and second hinge legs, and each driving device forming a gap on a top edge thereof, with the block portion limited in the gap, with the first and second driving devices movable between a folded position and an unfolded position, with the first and second driving devices being at a greater spacing longitudinally along the first and second hinge legs from the first and second hinges in the folded position than in the unfolded position, with the block portion being slideably received in the gap as the first and second driving devices move from the unfolded position to the folded position.

7. The support stand according to claim 1, wherein each table member further includes first and second recesses formed on the bottom thereof opposite to the first and second pivoting portions, with the first and second recesses communicating with a periphery of the table member, with each recess receiving the first end of the corresponding first and second support feet.

8. The support stand according to claim 1, wherein each table member further includes a plurality of receptacles formed on a top surface of the table member and adapted for installing feet of the barbecue stove.

9. The support stand according to claim 1, wherein the end of each table member extends between an outer periphery, with first and second concavities formed in the end and adjacent to the outer periphery, with the first and second hinges located in the first and second concavities of the first and second table members.

10. The support stand according to claim 9, further comprising a block portion extending longitudinally from each of the first and second hinges along the first and second hinge legs, and each driving device forming a gap on a top edge thereof, with the block portion limited in the gap, with the first and second driving devices movable between a folded position and an unfolded position, with the first and second driving devices being at a greater spacing longitudinally along the first and second hinge legs from the first and second hinges in the folded position than in the unfolded position, with the block portion being slideably received in the gap as the first and second driving devices move from the unfolded position to the folded position.

11. The support stand according to claim 1, further comprising first and second primary shelves respectively pivotally connecting between the first and second ends of the first and second support feet, with each primary shelf having an ear and a bolt inserted through the ear to connect with the corresponding hinge leg.

12. The support stand according to claim 1, wherein each table member further includes a second shelf received on the bottom thereof in storage and provided to be pulled in use.

13. The support stand according to claim 1, wherein each table member further includes at least one hook on a periphery of the table member.

14. The support stand according to claim 1, further comprising first and second elastic elements disposed between the first and second hinges and the actuating portion for each hinge, with the actuating portion being pivotal relative to each hinge between an attached position and an original position, with the actuating portion latching with the projection in the attached position, with the actuating portion spaced from the projection in the original position, with each elastic element biasing the actuating portion from the attached position to the original position.

15. The support stand according to claim 1, wherein the second end of each first leg is pivotally connected to the second end of the corresponding support foot about a pivot axis parallel to and at a constant spacing from the corresponding first and second pins.

* * * * *